United States Patent [19]

Barth

[11] 3,847,243
[45] Nov. 12, 1974

[54] AUXILIARY POWER SYSTEM ON A VEHICLE

[75] Inventor: John W. Barth, Topeka, Kans.

[73] Assignee: Allis-Chalmers Corporation, Milwaukee, Wis.

[22] Filed: Oct. 27, 1972

[21] Appl. No.: 301,655

[52] U.S. Cl. .............................. 180/79.2 R, 60/405
[51] Int. Cl. .............................................. B62d 5/06
[58] Field of Search.......... 180/79.2 R; 60/405, 404; 137/575

[56] References Cited
UNITED STATES PATENTS
3,275,177  9/1966   Barto .............................. 60/405 X
3,280,557  10/1966  Sattavara ............................ 60/405
3,333,413  8/1967   Mercier ........................... 60/405 X
3,434,282  3/1969   Shelhart ....................... 180/79.2 R
3,528,522  9/1970   Turke ........................... 180/79.2 R
3,590,689  7/1971   Brewer .............................. 60/405

Primary Examiner—David Schonberg
Assistant Examiner—John A. Pekar
Attorney, Agent, or Firm—Arthur L. Nelson

[57] ABSTRACT

An auxiliary power system in conjunction with a main hydraulic power system to assure braking and steering control under emergency conditions where the main hydraulic power system fails.

15 Claims, 6 Drawing Figures

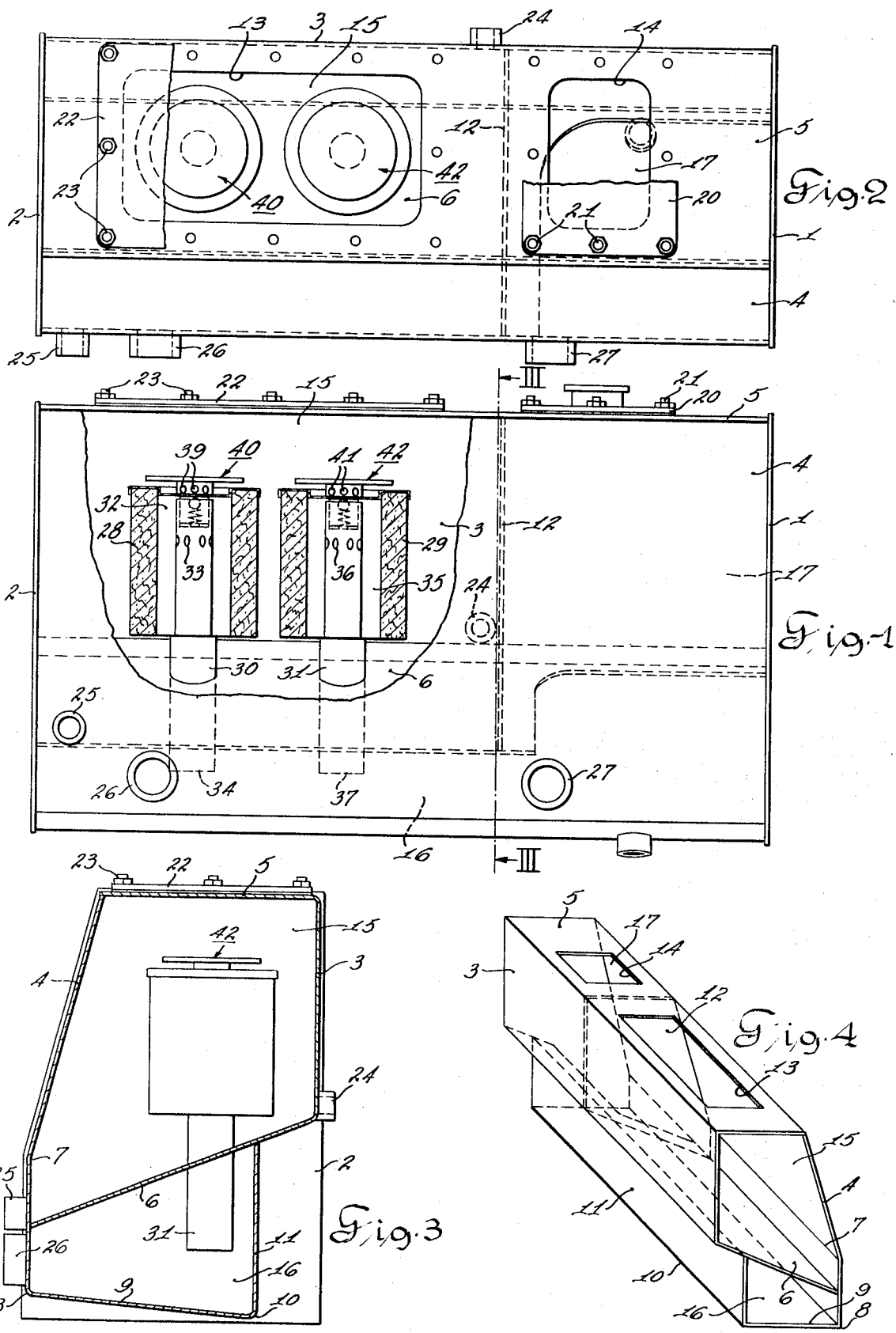

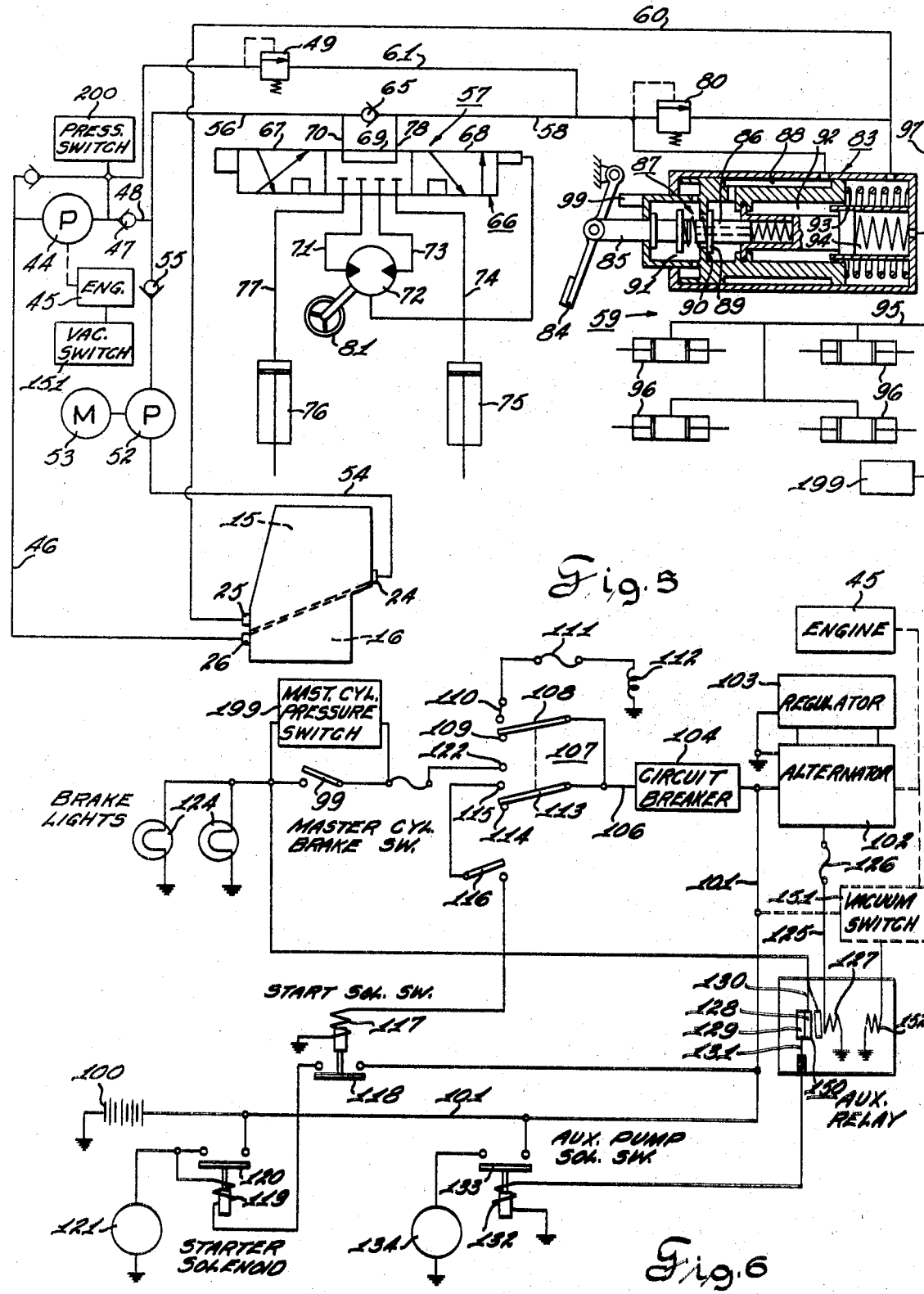

AUXILIARY POWER SYSTEM ON A VEHICLE

This invention relates to a hydraulic power system and more particularly to an auxiliary hydraulic power system which automatically supplies power in the event of failure of the main power system.

The modern industrial tractor employs considerable hydraulic equipment for various operations to be accomplished by the vehicle. The hydraulic equipment may include backhoes, front end loaders, graders, bulldozer blades, steering and power brakes. The use of power steering and power brakes, however, can present a safety hazard if there is no mechanical means whereby the vehicle may be steered or braked in event of hydraulic power failure of the main hydraulic system. Accordingly, it not only is desirable to have an auxiliary hydraulic power system to control the vehicle braking and steering, but government regulations in some instances require that an auxiliary system be employed to maintain safety of the operator of the vehicle and others who may happen to be in the area in which the vehicle is operated. Accordingly, this invention provides an auxiliary hydraulic power system in conjunction with the main hydraulic power system for controlling hydraulic operations in the event of hydraulic power failure of the main hydraulic system.

It is an object of this invention to provide an auxiliary hydraulic system for supplying hydraulic pressurized fluid in the event of failure of the main hydraulic system.

It is another object of this invention to provide an auxiliary source of pressurized fluid in conjunction with the main hydraulic system for supplying pressurized fluid in the event of failure of the main source of pressurized fluid.

It is a further object of this invention to provide an electrically controlled hydraulic system having an auxiliary source of pressurized fluid operating in response to actuation of a vehicle brake switch when the main source of pressurized fluid has failed.

It is a further object of this invention to provide an electrically operated auxiliary source of hydraulic pressurized fluid to supply pressurized fluid in the event of power failure in the vehicle which operates the main source of pressurized hydraulic fluid to thereby assure steering and braking control of the vehicle.

The objects of this invention are accomplished by providing power from the vehicle engine for driving the hydraulic pump which supplies pressurized fluid in a hydraulic system. The hydraulic system is used to operate various hydraulic functions on the vehicle including power operation for steering and the braking of the vehicle. When the vehicle engine stalls, if there is no mechanical braking system or mechanical steering system the operator does not have control of the vehicle since the hydraulic pressure immediately drops. Accordingly, this invention provides with a failure of the main source of pressurized fluid an auxiliary system is brought into operation.

The vehicle includes an electrical circuit for starting, headlights, backup lights, and an instrument panel having warning signals for operator. Included in the electrical circuit a key switch is connected from the battery to control the starting and running of the vehicle. Connected with the key switch is a fuel shutoff mechanism for starting and shutting off the fuel when the engine is started or stopped. In conjunction with the key switch is the master cylinder brake switch which operates the stop lights in the tail light assembly. Connected in the series through the master cylinder brake switch is also connected an auxiliary power relay switch which is normally opened when the engine is in operation. The relay is energized by the alternator on the vehicle. Connected to the normally open contacts is the auxiliary pump solanoid switch for operating the auxiliary pump motor.

When the vehicle engine stops the alternator also stops and the voltage lose to the auxiliary powered relay causes thereby to deenergize and the contacts are engaged by mechanical means to close the circuit to the auxiliary pump switch for starting of the auxiliary pump motor when the master cylinder brake switch is closed. Accordingly, when the brakes are actuated the switch is closed and the auxiliary pump switch operates the pump motor which in turn pressurizes hydraulic fluid through the auxiliary pump in the auxiliary system. With auxiliary hydraulic pump operating pressurize fluid is automatically directed into the portion of the hydraulic system to operate the brakes and the steering mechanism of the vehicle. This provides the control the operator needs for steering of the vehicle or braking of the vehicle even though the engine is stopped and the main source of pressurized fluid has failed.

The preferred embodiment of this invention is illustrated in the attached drawing.

FIG. 1 illustrates a front view of the reservoir with a portion of the reservoir broken away to show the filtering means and the auxiliary reservoir compartment.

FIG. 2 illustrates a top view of the reservoir showing the main reservoir and the auxiliary reservoir.

FIG. 3 is a section view taken on line III—III of FIG. 1.

FIG. 4 is a 3 dimensional view showing the general construction of the main and auxiliary reservoir compartments prior to assembly in the supporting structure for the reservoir.

FIG. 5 illustrates the hydraulic system showing the connection of the main hydraulic system with the auxiliary hydraulic system.

FIG. 6 illustrates an electrical circuit for use in conjunction with the hydraulic system of the vehicle.

Referring to the drawings FIGS. 1,2,3 and 4 illustrate the reservoir construction. The two sidewalls 1 and 2 provide a supporting means for the reservoir. Sidewalls 1 and 2 are welded to the back wall 3, front wall 4, top 5 and base 9. The reservoir may be constructed by folding the top 5 at right angles to the back wall 3 and forming an obtuse angle with the portion 6. The front wall 4 may then be constructed of a second piece of material which extends downwardly to form a slight bend at the fold line 7 and then downwardly to the front lower corner 8. The base 9 extends upwardly at a fold 10 where it is integral with panel 11. It is noted that the baffle 12 would be preferably welded before the two sections previously described are assembled. Accordingly this construction will form a top with an opening 13 and an opening 14. The reservoir forms an auxiliary reservoir compartment 15 and a main reservoir compartment 16. The main reservoir compartment 16 extends upwardly to communicate with compartment 17.

The cover plate 20 is fastened by a plurality of bolts 21 to close the chamber 17. The cover plate 22 is fastened by a plurality of bolts 23 to cover the auxiliary reservoir compartment 15.

The reservoir also includes a fitting 24 for connection to the intake side of the auxiliary pump and a fitting 25 for connection to the return side of the auxiliary hydraulic system.

The fitting 26 is connected to the intake side of the main hydraulic fuel pump while the fitting 27 is connected to the return side of the main hydraulic system.

It is noted that operation through the auxiliary compartment 15 does not require use of the filters 28 and 29. Recirculating hydraulic fluid flows through the auxiliary compartment 15 with the fitting 24 supplying the intake side of the auxiliary pump positioned at a higher level than the return fitting 25. The main hydraulic fuel pump operates through the use of filters 28 and 29. Filter 28 is mounted on the suction tube 30 while filter 29 is mounted on the suction tube 31. Filter 28 filters fluid flowing from chamber 15 into the filter chamber 32 which leads oil into the plurality of holes 33 and through the lower end 34 of the suction tube 30 and exhausts into the main hydraulic fluid compartment. Similarly the filter chamber 35 receives fluid which is filtered by the filter 29 and then passes through the plurality of holes 36 and discharged from the lower end 37 of suction tube 31 in the main fluid compartment.

Each of the filters is provided with a relief valve in the upper end of the filter compartment whereby fluid can flow through the plurality of holes 39 on the filter assembly 40 and the plurality of holes 41 on the filter assembly 42. This provides for the bypass in the event that the filters become clogged and prevent fluid from passing into the main compartment 16.

Referring to FIG. 5 the hydraulic system is shown. The main hydraulic fluid pump 44 is driven by the engine 45. The main hydraulic fluid pump 44 draws hydraulic fluid through the intake conduit 46 which is connected to the fitting 26. Pressurized fluid from the main hydraulic pump 44 passes through checkvalve 47 into conduit 48 leading to the main hydraulic fluid system 49 including steering and braking operations. The main hydraulic system may be used to provide fluid for operation of other hydraulic functions and a return conduit from the main hydraulic fluid system to return fluid through the fitting 27 to the main reservoir compartment.

The auxiliary hydraulic pump 52 is driven by an electric motor 53. The auxiliary hydraulic pump 52 receives hydraulic fluid from the auxiliary compartment 15 through the fitting 24 and conduit 54. Pressurized fluid from the high pressure side of the auxiliary pump 52 passes through the checkvalve 55 into the conduit 56 which supplies fluid to the hydraulic steering mechanism 57. Hydraulic fluid from the auxiliary pump 57 passes through the sterring mechanism prior to continuing through the conduit 58 to the brake mechanism 59. The return conduit 60 returns hydraulic fluid to the fitting 25 in the auxiliary compartment 15. It is noted that the hydraulic mechanisms 57 and 59 are not connected in series from the main hydraulic pump 44. Conduit 61 leads through valve 49 to a brake mechanism and enters conduit 58 just prior to the inlet passage for the brake mechanism 59.

The auxiliary hydraulic system operates the steering mechanism 57 and the brake mechanism 59. Conduit 56 is connected by the checkvalve 65 to conduit 58.

The fluid, however, must pass through a circuit leading through the steering valve 66. The steering valve 66 includes section 67 for steering the vehicle in the first direction and a section 68 for steering the vehicle in the opposite direction. The intermediate section 69 blocks passage of fluid in any direction and maintains the position of the steering wheels in the direction in which they were at the time the valve was closed as it is moved to the intermediate position.

When the valve is moved in the right-hand direction and section 67 is in operation the conduit 56 leads through passage 70, 71, the metering pump 72, passage 73, and back through the valve 66 and then through the passage 74 to the hydraulic actuator 75. The hydraulic actuator 76 discharges fluid through the passage 77 through the valve 66 to passage 78 into passage 58 to the brake mechanism 59. If the brakes are being actuated simultaneously the fluid passes through the brake mechanism, otherwise the fluid passes through the relief valve 80 and through the return conduit to the reservoir.

When the control valve 66 is in the neutral position no fluid passes through the valve in either direction. When the valve has shifted in the left-hand direction the section 68 is in operation. When section 68 is in operation the passage 70 supplies fluid through the valve to passage 73 through the metering pump 72, passage 71 back through the valve and into passage 77 and the hydraulic actuator 76 is extended. The hydraulic actuator 75 contracts and fluid in the hydraulic actuator 75 passes from the actuator to passage 74, 78 and conduit 58.

It is understood that the metering motor 72 is a hydraulic metering device which operates as a motor when the steering wheel is mechanically rotated in case of power failure. The metering motor 72 is essentially a metering device when power is supplied to the valve 66 and for a vehicle of large size the control of the vehicle is much easier and more reliable with power than if it must be controlled strictly as a manual operation.

The brake mechanism 59 includes a brake booster 83. The brake booster includes a brake pedal 84 operating through a pushrod 85. The pushrod 85 is connected to a power sleeve 86 which forms a valve 87. Pressurized fluid is supplied to the valve through the passage 88. As the pushrod 85 is moved forwardly valve element 89 is unseated from its valve seat 90 permitting pressurized fluid to enter the pressure chamber 91. Low pressure fluid is discharged from the low pressure chamber 92. The low pressure fluid returns through the conduit 60 to the reservoir. Simultaneously the master cylinder 93 pressurizes fluid in the pressurizing chamber 94 of the hydraulic brake system which is supplied through the conduit 95 leading to the brake wheel cylinders 96. Pressurized fluid is also supplied through the clutch conduit 97 to operate the clutch release valve to disengage the clutch. The hydraulic brake system operates master cylinder pressure switch 199 which will be described subsequently in the electrical circuit.

The electrical circuit is shown in FIG. 6. The electrical circuit includes a battery 100 which is connected through a conductor 101 to the alternator 102 which is in turn electrically connected to the voltage regulator 103. The battery and alternator are connected through the circuit breaker 104 to the electrical connecter 106.

The key switch 107 is a two-part switch having a fuel control switch arm 108 connected to the terminal 109 in the off position. When a key switch is operated the fuel control arm is moved to the terminal 110 and supplies electrical energy through the fuse 111 and the solenoid coil 112 to operate the fuel solenoid operating the fuel supply pump. The second part of the switch 107 includes a switch arm 113 which in the off position contacts terminal 114. When the key switch arm is moved to the start position contacting terminal 115 and with the neutral start switch 116 closed the solenoid coil 117 is energized. This in turn closes the motor switch 118 and the starter solenoid coil 119 and starter switch 120 to operate the starter 121. The key switch is connected to the terminal 122 in the run position and through the brake switch 199 to operate the brake tail lights 124.

While the engine 45 is operating the alternator is also operating. A terminal on the alternator is connected to the conductor 125 through the fuse 126 and to the auxiliary relay 127. With the auxiliary relay 127 energized the contacts 128 and 129 are disengaged and the circuit through the contacts is open. When the engine is stalled the alternator is no longer operating and no voltage is applied to the coil 127. The reeds 130 and 131 bias the contacts to an engagement position to energize the coil 132. With the coil 132 energized the auxiliary pump switch 133 closes and the auxiliary pump motor 134 is energized. This drives the auxiliary pump 52 in the auxiliary hydraulic system.

While the description of the above relates primarily to the starter circuit and the operation of the auxiliary motor to drive the auxiliary pump it is understood that the electrical circuit of the vehicle may include other electrical functions as well. A vacuum switch 151 is shown in phantom operating in response to vacuum in the intake manifold at the engine 45. The vacuum switch 151 is normally closed and coil 152 is energized when vacuum is present in the manifold and the switch 151 is mechanically biased to an open position to deenergize coil 152 when the engine is stalled allowing switch 150 to close for starting at motor 134.

The operation of the system will be described in the following paragraphs.

The main hydraulic pump 44 for the main hydraulic system normally operates the steering and the braking operations. The pressurized hydraulic fluid is supplied through the checkvalve 47 and pressurized fluid is supplied to the steering mechanism 57 through the conduit 56 while pressurized fluid is also supplied through the conduit 61 for the brake mechanism 59. The steering wheel 81 operates the valve 66 and the metering pump 72 which is essentially a gear pump which meters hydraulic fluid as it is supplied to the hydraulic actuator 75 and 76. The hydraulic actuators 75 and 76 are essentially rams operating in a single direction in response to the control valve 66 and metering pump 72.

The brake mechanism 59 includes the booster 83 which in turn is controlled by the brake pedal 84. The brake pedal 84 operates a valve 87 in the booster unit which is supplied with pressurized fluid to assist in the operation of the master cylinder 92. Pressurized fluid from the master cylinder operates the wheel cylinders 96 to engage the brakes of each of the wheels.

As the brakes are actuated the master cylinder pressure switch 199 is closed. This in turn operates the brake tail lights. With a key switch 107 in the on position electrical energy is supplied from the battery 100 through the key switch through the brake pressure switch 199. When the alternator is stalled due to a stalled engine 45 no voltage is supplied in the connector 125 and the solenoid coil 127 is deenergized. A switch 150 having reeds carrying contacts 128 and 129 is then closed position by the resilience of the reeds and electrical energy is supplied to the solenoid coil 132. This in turn causes the auxiliary pump switch 133 to close and the motor 134 is energized. As the motor is energized the auxiliary pump 52 operates and pressurized fluid is supplied through the checkvalve 55 to the auxiliary system which includes conduit 56. With pressurized fluid again in conduit 56 the steering mechanism and brake mechanism are in condition for operation. Accordingly the auxiliary hydraulic system operates in response to operation of the brake when the alternator is stalled. The auxiliary motor 134 operates the auxiliary pump automatically to maintain pressurized fluid in the auxiliary system. This provides the operator with control of the vehicle.

In event that the master cylinder pressure switch 199 fails, further depression of the pedal 84 will cause the mechanical brake switch 99 to close. Since switch 99 is in parallel with switch 199, the system will operate the same as described above.

The vacuum switch 151 illustrates an embodiment wherein vacuum of the intake manifold controls the auxiliary relay and switch 150. The operation of the system is the same as described above, except a loss of vacuum closes switch 150 and motor 134 is started when the brakes are actuated.

A further embodiment provides for a pressure switch 200 in the main hydraulic system which may be operated automatically when pressure fails in place of the brake pressure switch 199 to start motor 134.

The embodiments of the invention in which an exclusive property or privilege is claimed are defined as follow:

1. A hydraulic system for use on a vehicle comprising a main source of pressurized fluid adapted for being driven by the vehicle engine, an auxiliary source of pressurized fluid, valve means connected between said main source of pressurized fluid and said auxiliary source of pressurized fluid for transmitting pressurized fluid from the source of highest pressure through said system, an electrical circuit including a source of electrical energy, an electric motor driving said auxiliary source of pressurized fluid, an automatically operated switch means including, means connected to said engine normally biasing said automatically operated switch means to an open position when said engine is operating, a manually operated switch means including a brake switch connected in series with said automatically operated switch means, starting means for starting said electric motor to operate said auxiliary source of pressurized fluid when said switch means are closed to thereby provide an auxiliary source of pressurized fluid for maintaining operation of said hydraulic system.

2. A hydraulic system for use on a vehicle as set forth in claim 1 wherein said automatically operated switch means includes, a current generating means driven by said engine, a normally open switch connected to said current generating means having means to maintain said switch open in response to operation of said current generating means and thereby close said automatically operated switch means when said current generating means is stalled.

3. A hydraulic system for use on a vehicle as set forth in claim 1 wherein said hydraulic system includes a reservoir means for supplying low pressure hydraulic fluid, means defining a main compartment for supplying fluid to said main source of pressurized fluid and means defining an auxiliary compartment for supplying fluid to said auxiliary source of pressurized fluid.

4. A hydraulic system for use on a vehicle as set forth in claim 1 wherein said hydraulic system includes a hydraulically operated steering mechanism for steering said vehicle.

5. A hydraulic system for use on a vehicle as set forth in claim 1 including a hydraulic brake actuating means for operating the vehicle brakes.

6. A hydraulic system for use on a vehicle as set forth in claim 1 wherein said automatically operated switch means includes an engine driven current generating means connected to a solenoid to open said automatically operated switch means when said current generating means is in operation.

7. A hydraulic system for use on a vehicle as set forth in claim 1 wherein said hydraulic system includes a hydraulic steering mechanism for steering said vehicle, a hydraulic brake mechanism for braking said vehicle and means for connecting said brake and said steering mechanism for operation in said hydraulic system.

8. A hydraulic system for use on a vehicle as set forth in claim 1 including hydraulic means for operating the vehicle brakes, hydraulic clutch control means adapted for operating the vehicle clutch in said hydraulic system.

9. A hydraulic system for use on a vehicle as set forth in claim 1 wherein said manually operated switch means includes a key switch in said electrical system connected in series with said brake switch and said automatic switch means to control operation of said motor, said motor thereby driving said auxiliary pump in response to operation of said brake switch and closing of said automatic switch means.

10. A hydraulic system for use on a vehicle as set forth in claim 1 wherein said automatically operated switch means includes a current generator driven by said engine, a solenoid switch having a solenoid connected to said generator for normally biasing said automatically operated switch means to an open position when said generator is operating.

11. A hydraulic system for use on a vehicle as set forth in claim 1 wherein said automatically operated switch means includes a solenoid, a current generator driven by said engine, means connecting said solenoid to said current generator for normally maintaining said automatically operated switch means in an open position, said automatically operated switch means including mechanical means for closing said automatically operated switch means for energizing said auxiliary motor when said generator is stalled.

12. A hydraulic system for use on a vehicle as set forth in claim 1 including a reservoir comprising means defining a main compartment and an auxiliary compartment, filter means in said auxiliary connected between said main compartment and said auxiliary compartment to thereby provide filtering of hydraulic fluid flow between compartments when said hydraulic system is in operation.

13. A hydraulic system for use on a vehicle as set forth in claim 1 wherein said automatically operated switch means includes a vacuum switch adapted for operation by vacuum in the engine to thereby energize said starting means when no vacuum is present.

14. A hydraulic system for use on a vehicle as set forth in claim 1 wherein said automatically operated switch includes a current generator driven by said engine, electrical means connected to said generator to normally deenergize said starting means when said generator is running and energize said starting means when said generator is stalled.

15. A hydraulic system for use on a vehicle comprising, a main source of pressurized fluid adapted for being driven by the vehicle engine, an auxiliary, source of pressurized fluid, valve means between said main source of pressurized fluid and said auxiliary source of pressurized fluid for transmitting pressurized fluid from the source of highest pressure through said system, an electrical circuit including a source of electrical energy, an electric motor driving said auxiliary source of pressurized fluid, a current generating means driven by said engine, a normally open switch means connected to said current generating means, electrical means biasing said switch means to an open position when said current generating means is operating, a brake switch connected in series with said switch means, starting means for starting said electric motor connected in series with said brake switch and said switch means to operate said auxiliary source of pressurized fluid when said switch means is closed responsive to said current generating means not operating and said brake switch is closed responsive to operation of a vehicle brake to thereby provide an auxiliary source of pressurized fluid for maintaining operation of said hydraulic system.

* * * * *